(12) United States Patent
Matsumoto et al.

(10) Patent No.: US 6,638,432 B2
(45) Date of Patent: Oct. 28, 2003

(54) METHOD OF TREATING WASTE LIQUID

(75) Inventors: Yukihiro Matsumoto, Kobe (JP); Takeshi Nishimura, Himeji (JP); Kazuto Okazaki, Himeji (JP); Kiyotaka Watanabe, Hyogo (JP)

(73) Assignee: Nippon Shokubai Co., Ltd., Osaka (JP)

(*) Notice: Subject to any disclaimer, the term of this patent is extended or adjusted under 35 U.S.C. 154(b) by 79 days.

(21) Appl. No.: 09/893,486

(22) Filed: Jun. 29, 2001

(65) Prior Publication Data

US 2002/0000413 A1 Jan. 3, 2002

(30) Foreign Application Priority Data

Jun. 30, 2000 (JP) .................................... 2000-198230

(51) Int. Cl.$^7$ .................................................. C02F 1/62
(52) U.S. Cl. ..................... 210/710; 95/152; 95/189; 95/195; 110/345; 210/718; 210/725; 210/727; 210/912; 588/205
(58) Field of Search .................. 95/152, 189, 195–197; 110/345; 210/710, 718, 725, 727, 728, 737, 912; 562/532–535; 588/205

(56) References Cited

U.S. PATENT DOCUMENTS

| | | | | |
|---|---|---|---|---|
| 3,575,853 A | * | 4/1971 | Gaughan et al. | 210/667 |
| 3,725,266 A | * | 4/1973 | Haviland | 210/710 |
| 4,169,053 A | * | 9/1979 | Sakakibara et al. | 210/724 |
| 4,217,209 A | * | 8/1980 | Steffan et al. | 210/734 |
| 4,500,324 A | * | 2/1985 | Vuong | 48/197 R |
| 4,729,882 A | | 3/1988 | Ide et al. | 423/210 |
| 5,077,434 A | * | 12/1991 | Sarumaru et al. | 562/534 |
| 5,419,834 A | | 5/1995 | Straten | 210/198.1 |
| 5,582,634 A | * | 12/1996 | Burdis | 95/174 |
| 5,764,690 A | * | 6/1998 | Blanchard et al. | 375/147 |
| 5,855,793 A | * | 1/1999 | Ikeda et al. | 210/711 |
| 6,139,755 A | * | 10/2000 | Marte et al. | 210/752 |
| 6,348,638 B1 | * | 2/2002 | Schliephake et al. | 588/205 |
| 6,405,663 B1 | * | 6/2002 | Jones | 110/342 |

FOREIGN PATENT DOCUMENTS

| | | |
|---|---|---|
| DE | 33 43 117 | 11/1984 |
| DE | 41 23 258 | 1/1993 |
| EP | 0 212 855 | 3/1987 |
| EP | 0 448 178 | 9/1991 |
| EP | 0 453 005 | 10/1991 |
| EP | 0 860 197 | 8/1998 |
| JP | 50-16359 | 2/1975 |
| JP | 57-15886 | 1/1982 |
| JP | 57-175812 | 10/1982 |
| JP | 60-68094 | 4/1985 |
| JP | 7-112555 | 12/1995 |
| JP | 2000-514419 | 10/2000 |
| WO | WO 97/48669 | * 12/1997 |

OTHER PUBLICATIONS

Technology and Regulation for preventing environment pollution (Volume of water quality), pp. 137–140 (1987).

* cited by examiner

Primary Examiner—Peter A. Hruskoci
(74) Attorney, Agent, or Firm—Wenderoth, Lind & Ponack, L.L.P.

(57) ABSTRACT

Disclosed is a method of removing heavy metals contained in exhaust gas which has been generated by burning a waste liquid containing the heavy metals discharged in a process of producing organic compounds. The method includes the steps in the order of: (a) a combustion step of burning the waste liquid to produce exhaust gas; (b) a gas-liquid contact step of rendering a liquid containing an alkali compound in contact with the exhaust gas to collect the heavy metals in bottoms of the liquid; and (c) a coagulating step of adding a coagulant to the bottoms to coagulate the heavy metals in the bottoms for removal of the heavy metals. According to this method, the heavy metals contained in the exhaust gas can be efficiently separated and removed.

6 Claims, 1 Drawing Sheet

METHOD OF TREATING WASTE LIQUID

BACKGROUND OF THE INVENTION

1. Field of the Invention

This invention relates to a method of removing heavy metals contained in exhaust gas which has been generated by burning a heavy-metal-containing waste liquid discharged in a process of producing organic compounds. More specifically, this invention pertains to a method of separating and removing heavy metals contained in exhaust gas which has been generated by burning a waste liquid containing organic substances and heavy metals discharged accompanied with production of easily-polymerizable substances such as (meth)acrylic acid and/or esters thereof.

2. Description of the Related Art

Industrial waste water containing heavy metals adversely affects the environment. In view of this, it has been a customary practice to discharge waste water after removing heavy metals from the waste water by way of various processes. Particularly, waste water discharged accompanied with production of easily-polymerizable substances such as (meth)acrylic acid contains organic substances and heavy metals. A technique of rendering such waste water harmless involves complicated processes.

Heretofore, catalysts containing heavy metals have been used to react with raw materials when producing easily-polymerizable substances. Polymerization inhibitors containing heavy metals are used as such inhibitors as to prevent polymerization of easily-polymerizable substances in the aforementioned production process. For instance, in the production process of (meth)acrylic acids, catalysts are used in a catalytic gas phase oxidation process in which raw materials are subjected to oxidation with the catalysts to obtain reaction gas. Polymerization inhibitors are used in a process of absorbing acrylic acids by contacting with obtained reaction gas in water, and in a process of obtaining acrylic acids from an aqueous solution of acrylic acid by distillation, stripping, extraction, crystallization, etc. The catalysts and the polymerization inhibitors used in the aforementioned processes contain heavy metals such as copper, manganese, chromium, cobalt, nickel, tin, zinc, and iron. These heavy metals derived from the catalysts and the polymerization inhibitors are removed as impurities in the process of producing acrylic acids, and are discharged through the waste water and waste oil together with other impurities. Burning these waste water and waste oil, however, merely results in emission of exhaust gas containing the heavy metals in the air. In view of this, there has been requested a new technology that enables emission of exhaust gas free from the heavy metals.

As a technology for removing heavy metals from exhaust gas, for example, an indirect cooling method has been proposed. According to this method, exhaust gas obtained by combustion of heavy-metal-containing waste water is introduced in a cooling device where the exhaust gas is cooled by a cooling medium to thereby remove the heavy metals. In the case of the indirect cooling method, however, the heavy metals may likely to adhere or deposit on the inner surface of a gas flow pipe of the cooling device. A long-time operation of the heavy metal removing may lower heat efficiency of the cooling device. Accordingly, operation of the cooling device has to be suspended periodically to remove the heavy metals deposited in the cooling device. Also, an enormous labor has been required to remove the adhered heavy metals from the device.

As another technique of removing heavy metals from exhaust gas, there has been proposed a direct contact cooling method in which a liquid is, for example, rendered into contact with exhaust gas. In this technique, since the liquid and the gas are rendered in direct contact with each other, heavy metals in the exhaust gas can be swiftly transferred to the liquid. However, since the liquid after the direct contact contains the heavy metals, an additional process of separating and removing the heavy metals from the liquid is required to discharge the liquid outside the system of producing acrylic acids in a harmless manner. A technique of efficiently separating and removing the heavy metals from the liquid has not been found.

SUMMARY OF THE INVENTION

In view of the above, an object of this invention is to provide a method of removing heavy metals contained in exhaust gas which has been generated by burning a waste liquid containing the heavy metals discharged during a process of producing organic compounds. This method comprises steps of rendering the exhaust gas in contact with a liquid containing an alkali compound to precipitate the heavy metals in the liquid; and adding a coagulant to the liquid to coagulate the heavy metals in the liquid for removal of the heavy metals.

These and other objects, features and advantages of the present invention will become more apparent upon a reading of the following detailed description and accompanying drawing.

DETAILED DESCRIPTION OF THE PREFERRED EMBODIMENTS OF THE INVENTION

Figure 1:
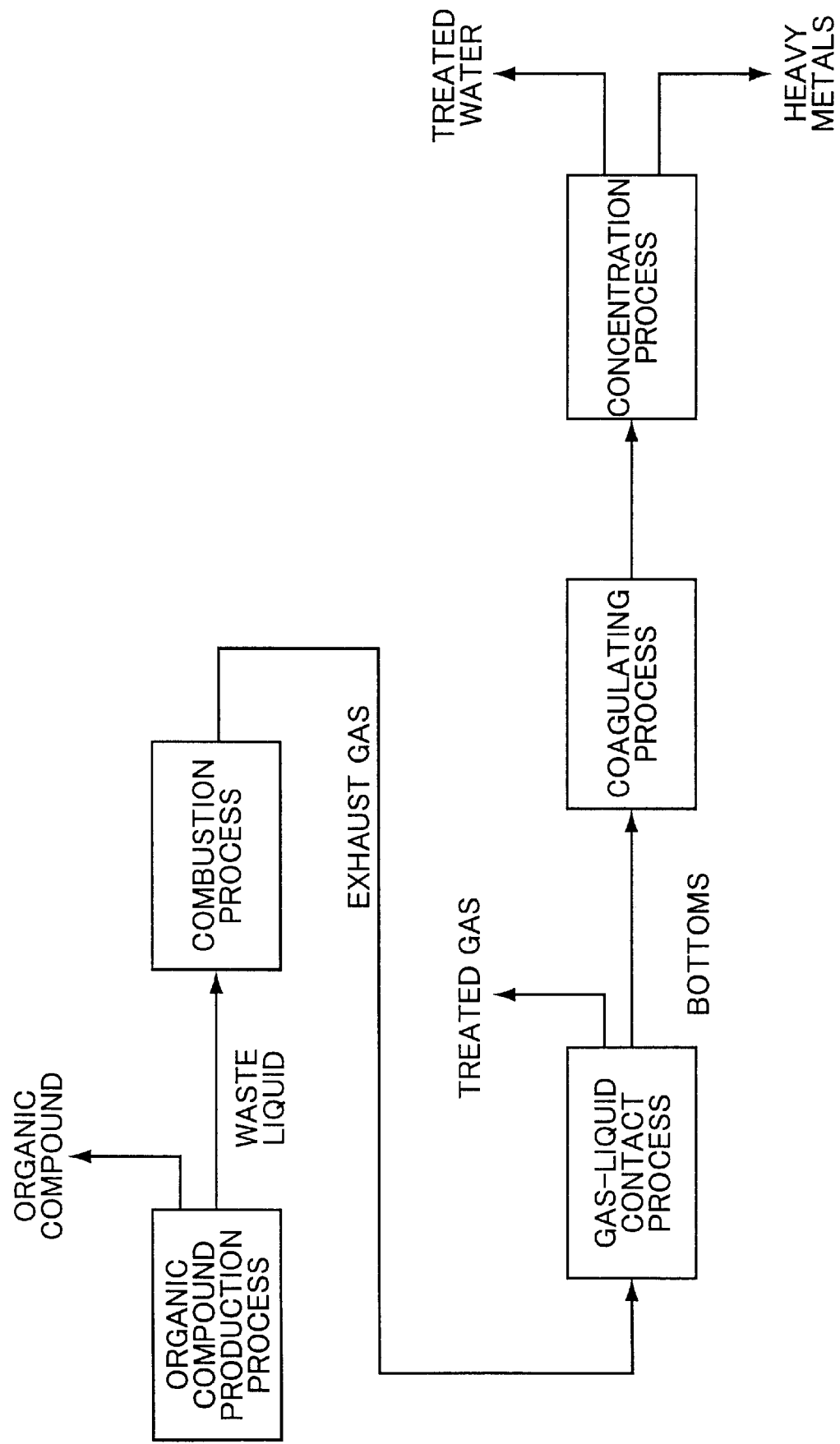
FIG. 1 is a schematic diagram illustrating an example of a series of processes of removing heavy metals according to a waste liquid treating method of this invention.

The inventors of this application found out, after an intensive study and development of a method for removing heavy metals from combustion exhaust gas which has been generated by burning a waste liquid containing the heavy metals discharged during a process of producing organic compounds, that rendering the combustion exhaust gas in contact with a liquid containing an alkali compound to precipitate the heavy metals in the liquid, and adding a coagulant to the liquid to coagulate the heavy metals in the liquid enables to efficiently remove the heavy metals from the waste liquid.

The inventive method is advantageous in efficiently removing heavy metals from a waste liquid such as waste water and waste oil which contains organic compounds and the heavy metals and is discharged in a process of producing (meth)acrylic acids and esters thereof. When implementing the inventive method, it may be preferable to adjust the amount of the alkali compound in the liquid in advance so that pH of the liquid after contact with the combustion exhaust gas (namely, bottoms staying at the bottom of the device) is kept in the range of 4 to 10. Further, adding an alkali compound to the bottoms so that pH of the bottoms may be kept in the range of 6 to 10 is more preferable in enhancing the effect due to addition of the coagulant.

In this invention, the waste liquid is a heavy-metal-containing liquid that needs removal of heavy metals when being discharged outside the system of producing acrylic acids. The method according to this invention is particularly suitable in removing heavy metals from a liquid containing organic substances and heavy metals.

A process of producing organic compounds which accompanies discharge of the aforementioned heavy-metal-containing waste liquid is not limited to a specific one, as far as the process accompanies discharge of the heavy-metal-containing waste liquid. As an example of the process of producing organic compounds which accompanies discharge of waste liquid containing the organic compounds and heavy metals, a process of producing easily-polymerizable compounds is described in this specification. The easily-polymerizable compounds include (meth)acrylic acids and (meth)acrylic esters. (Meth)acrylic esters include methylesters, ethylesters, isopropylesters, n-butylesters, 2-ethylhexylesters, 2-hydroxyethylesters, hydroxypropylesters, dialkylaminoethylesters.

The inventive method is remarkably advantageous in removing heavy metals from waste water and/or waste oil discharged in a process of producing (meth)acrylic acids and/or esters thereof which are examples of the easily polymerizable compounds. The waste water and/or waste liquid discharged in the production process include waste liquid which is produced and/or by-produced in each of the devices used in the production process (e.g., a reactor, a condenser, an extracting tower, a distillation tower, and a stripping tower). The waste oil includes a distilled residue oil containing impurities having a high boiling point, and distillating oil containing impurities having a low boiling point. The waste water includes water produced and/or by-produced by various chemical reactions, waste water derived from water supplied to the production process (absorbing water, solvent, water for neutralization, water component in the air, etc.), and waste water used for driving a depressurizing device such as an ejector.

The method of treating waste liquid according to this invention is described by taking an example of a process of producing acrylic acids according to a propylene oxidation process which accompanies production and by production of waste water and waste oil (hereinafter, simply referred to as "waste liquid"). The inventive method is not limited to the above, and is applicable to treatment of waste liquid discharged in the process of producing a variety of easily-polymerizable substances.

In the case of producing acrylic acids according to a propylene oxidation process, for example, propylene is subjected to catalytic gas phase oxidation to obtain reaction gas. The thus obtained reaction gas is contacted with water to absorb acrylic acids in an aqueous solution of acrylic acid. Subsequently, water, impurities of a low boiling point, and impurities of a high boiling point in the aqueous solution are separated and purified by azeotropic distillation or the like to obtain acrylic acids of high purity. In this production process, various devices such as an oxidation reactor, a dehydrating tower, a light-end cut, a heavy-end cut, a distillation tower, and a film evaporator are used according to needs.

Catalysts used in producing acrylic acids by reacting propylene-containing gas according to two-stage catalytic gas phase oxidation include, for instance, an oxidizing catalyst, as a first-stage catalyst, which is generally used in producing acrolein by reacting a raw gas containing propylene according to gas phase oxidation, and an oxidizing catalyst, as a second-stage catalyst, which is generally used in producing acrylic acids by reacting the gas containing acrolein according to gas phase oxidation.

The first-stage catalyst includes the one represented by the formula:

$$Mo_aBi_bFe_cA_dB_eC_fD_gO_x$$

where Mo is molybdenum; Bi is bismuth; Fe is iron; A is nickel and/or cobalt; B is at least one element selected from the group consisting of alkali metals and thallium; C is at least one element selected from the group consisting of phosphor, niobium, manganese, cerium, tellurium, tungsten, antimony, and lead; D is at least one element selected from the group consisting of silicon, aluminum, zirconium, and titanium; and O is oxygen, and a, b, c, d, e, f, g, and x represent ratios of the elements, Mo, Bi, Fe, A, B, C, D, and O in terms of atom, respectively. For example, when a is 12, b is in the range of 0.1 to 1.0;. c is in the range of 0.1 to 10; d is in the range of 2 to 20; e is in the range of 0.001 to 5; f is in the range of 0 to 5; and g is in the range of 0 to 30, and x is a value which is determined depending on the oxidized state of each of the elements other than oxygen.

The second-stage catalyst includes the one represented by the formula:

$$Mo_aV_bW_cCu_dA_eB_fC_gO_x$$

where Mo is molybdenum; V is vanadium; W is tungsten; Cu is copper; A is at least one element selected from the group consisting of antimony, bismuth, tin, niobium, cobalt, iron, nickel, and chromium; B is at least one element selected from the group consisting of alkali metals, alkali earth metals, and thallium; C is at least one element selected from the group consisting of silicon, aluminum, zirconium, and cerium; and O is oxygen, and a, b, c, d, e, f, g, and x represent ratios of the elements, Mo, V, W, Cu, A, B C, and O in terms of atom, respectively. For instance, when a is 12, b is in the range of 2 to 14; c is in the range of 0 to 12; d is in the range of 0.1 to 5; e is in the range of 0 to 5; f is in the range of 0 to 5; and g is in the range of 0 to 20, and x is a value which is determined depending on the oxidized state of each of the elements other than oxygen.

In this production process, distilled residue oil is discharged, as waste oil, from the separation towers such as a heavy-end cut, a purifying/distillation tower, and a film evaporator, and from the bottom of the distillation tower. Water discharged from the dehydrating tower and water ejected from the ejector to reduce the internal pressure of the dehydrating tower, the separation tower, and the purifying/distillation tower are discharged as waste water.

The following polymerization inhibitors are supplied in purifying and separating acrylic acids to prevent polymerization of acrylic acids. These polymerization inhibitors are also discharged together with the waste oil and waste water. Such polymerization inhibitors include the mixture of: at least one selected from the group consisting of hydroquinones, phenothiazines, methoquinones, nitroso compounds, and N-oxyl compounds; and at least one selected from the group consisting of manganese salts such as manganese acetate and manganese octanoate, copper salts such as copper acetate, copper dimethylthio carbamate, copper diethyldithio carbamate, copper dipropyldithio carbamate, and copper dibutyldithio carbamate, and chromium salts such as chromium acetate. The aforementioned polymerization inhibitors are, for instance, dissolved in (meth)acrylic acid or solvent, and the solution is fed to a supply line for supplying feed liquid, reflux liquid and bottoms circulating liquid, or directly supplied into a distillation device.

The waste liquid discharged in the production process of acrylic acids in the aforementioned various manners contain organic compounds as well as the heavy metals which are derived from the catalysts and the polymerization inhibitors.

The heavy-metal-containing waste liquid discharged in the production process of the organic compounds is burned in a combustion furnace (hereinafter, referred to as "combustion process"). The type of the combustion furnace is not limited to a specific one. Any known combustion furnace such as a direct heating furnace, an indirect heating furnace, and a reacting furnace is usable.

The method of burning the waste liquid is not specifically limited. One of the methods of burning the heavy-metal-containing waste liquid in a combustion furnace includes the step of burning the waste liquid while supplying a combustion improver such as kerosene and air into the combustion furnace. As an altered form, it may be preferable to burn the waste liquid at a high temperature (e.g., in the range of 600 to 1200° C.) in the combustion furnace while supplying the waste liquid to the combustion furnace in a fine particle state by an atomizer or the like. At this time, it may be preferable to regulate the supplied amount of the combustion improver or the flow rate of the waste liquid so that the temperature in the furnace is kept within a predetermined range. Further, using a vertical combustion furnace is preferable in the aspect that deposition of the heavy metals and/or other foreign matters in the furnace is suppressed compared to the case where a horizontal combustion furnace is used.

Burning the waste liquid according to the aforementioned manner results in emission of exhaust gas. The heavy metals in the waste liquid remains in the exhaust gas after the combustion in the form of oxides (e.g., copper oxides such as CuO and $Cu_2O$, and manganese oxides such as $MnO_2$, $Mn_2O_3$). It should be noted that these oxides of heavy metals are also referred to as "heavy metals" in this specification.

Exhaust gas generated by combustion of the heavy-metal-containing waste liquid is brought to a gas-liquid contact process. In this process, the exhaust gas is contacted with a liquid to cool the exhaust gas while sufficiently removing the heavy metals (including oxides of heavy metals) from the exhaust gas, thereby securing to emit the exhaust gas substantially free from the heavy metals in the air. The heavy metals removed from the exhaust gas are left in the liquid.

The method of contacting the exhaust gas with a liquid is not specifically limited. For instance, a venturi-type scrubber is used into which the exhaust gas is introduced together with droplets of sprayed liquid ejected through a nozzle to render the exhaust gas in direct contact with the liquid. This technique enables to transfer the heat of the exhaust gas after the combustion to the liquid, accompanied with transfer of the heavy metals from the exhaust gas to the liquid. Thus, cooling of the exhaust gas and removal of the heavy metals are simultaneously accomplished.

Alternatively, it may be preferable to provide a tank filled with a liquid inside the gas-liquid contact device in such a manner as to render the liquid in the tank in contact with the exhaust gas. The contact of the liquid in the tank with the exhaust gas may include passing of the exhaust gas through the liquid. As far as the liquid is contacted with the exhaust gas, the contacting method is not limited.

In the case of an indirect cooling method in which the exhaust gas is not brought to direct contact with a liquid (water), it is highly likely that the heavy metals may adhere to the inner surface of a gas flow pipe, with the result that the operation of the cooling device is required to be suspended to remove the heavy metals. As a result, a long time operation of the cooling device may be hindered.

For instance, using a waste heat boiler in which exhaust gas is flowed in a pipe and boiler water is flowed in a shell to generate steam may likely to adhere the heavy metals inside the pipe, thereby causing clog in the boiler. Conversely to this arrangement, using the arrangement that exhaust gas is flowed in the shell and boiler water is flowed in the pipe may also likely to adhere the heavy metals on the outer surface of the pipe. In either case, a long-time operation of the cooling device is hindered. Further, in the case of using an indirect cooling device, the heavy metals in the exhaust gas are not sufficiently removed, with the result that the residue rate of the heavy metals in the exhaust gas emitted after the cooling is high.

In view of the above, a direct contact cooling method of rendering the exhaust gas in direct contact with a liquid is recommendable. A known gas-liquid contact device is applicable for this method. It is recommendable to use the above-mentioned gas-liquid contact device provided with a tank filled with a liquid in light of feasibility of separating and removing the heavy metals. Direct contact of the exhaust gas containing the heavy metals with the liquid in a tank to collect the heavy metals in the liquid at the bottom of the device (hereinafter, the liquid at the bottom of the tank is simply referred to as "bottoms") enables to efficiently precipitate the heavy metals in the bottoms, thereby accomplishing discharge of the exhaust gas free from the heavy metals in the air.

It is recommendable to use the liquid containing alkali compounds for the gas-liquid contact so as to collect the heavy metals contained in the exhaust gas in the bottoms and to sufficiently remove the heavy metals from the exhaust gas.

The amount of alkali compound in the liquid is not specifically limited. For instance, in the case where pH of the bottoms after the gas-liquid contact is 3 or less, there may be a likelihood that the heavy metals are not sufficiently precipitated in the bottoms with the result that the heavy metals in the exhaust gas is not sufficiently removed. It is not desirable in the aspect of efficiency to carry on precipitation and removal of the heavy metals under such a low pH condition. In view of various factors such as what is to be produced as easily-polymerizable substances, and the production process thereof, it is recommended to regulate the amount of alkali compound in the liquid containing such alkali compound so that pH of the bottoms is kept in the range of 4 to 10.

It is preferable to set the lowermost value of pH of the bottoms after the gas-liquid contact at 4 or more, more preferably 5 or more, and furthermore preferably 6 or more. It is preferable to set the uppermost value of pH of the bottoms after the gas-liquid contact at 10 or less, more preferably 9 or less, and furthermore preferably 8 or less. Setting the lowermost and uppermost values of pH as mentioned above enables to efficiently precipitate the heavy metals in the bottoms and effectively reduce the amount of heavy metals remaining in the exhaust gas (treated gas) after the gas-liquid contact.

If pH falls below 4, the heavy metals do not sufficiently precipitate, thereby leading to difficulty in separating the heavy metals from the bottoms. On the other hand, if pH exceeds 10, it is highly likely that the heavy metals once precipitated may be dissolved in the bottoms again, thereby also leading to difficulty in separating the heavy metals from the bottoms.

In this invention, the alkali compound includes alkali metal hydroxides of sodium and potassium, and alkali metal sulfides of alkali metals. The kind of alkali compound is not limited to the above. Particularly, it is recommendable to use sodium sulfide having a high solubility and a fast reaction rate in this invention. Also, using sodium sulfide is preferable because sodium sulfide provides higher precipitation rate of heavy metals than sodium hydroxide.

It should be noted that the supply site of the alkali compound is not specifically limited. For instance, the alkali compound may be directly supplied to a combustion furnace, or may be supplied to a combustion furnace along with a waste liquid. Alternatively, the alkali compound may be directly supplied to the liquid for gas-liquid contact. As far as pH of the bottoms to be discharged from the gas-liquid contact device is kept within the aforementioned range, the alkali compound may be supplied from any site with the supply amount thereof adjusted. Supply of alkali metal compound to the combustion furnace is desirable because addition of alkali metal compound helps efficient precipitation of hydroxides of the heavy metals due to gas-liquid contact.

The amount of alkali compound contained in the liquid is not specifically limited. However, it may be desirable to supply the alkali compound in such an amount as to keep pH of the bottoms in the aforementioned predetermined range.

The method of feeding liquid and gas to the gas-liquid contact device is not specifically limited in this invention. Liquid and gas may be continuously or intermittently fed to the gas-liquid contact device depending on the operating condition of the device. Bottoms and treated gas after the gas-liquid contact may be continuously or intermittently discharged.

The heavy metals which have been precipitated in the bottoms are discharged in the bottoms after the gas-liquid contact. According to this invention, the bottoms are brought to a coagulating process in which the heavy metals are coagulated to separate the heavy metals from the bottoms.

Hereinafter, the coagulating process is described by taking an example of feeding the bottoms to an agitation/mixing tank. A known device is used as a device for performing the coagulating process.

In this invention, the coagulating process is a process of coagulating the heavy metals precipitated in the bottoms into floc by adding a coagulant to the bottoms which have been taken out from the gas-liquid contact process (device) to precipitate the floc of the heavy metals in the bottoms.

It may be preferable to use an inorganic coagulant and an organic high-molecular coagulant in combination. In the case where an inorganic coagulant is used alone, mechanical strength of the resultant particles of heavy metals after coagulation is not sufficient. Namely, linking force among the heavy metals is weak, which resultantly hinders formation of larger particles. Also, the particles resulting from use of an inorganic coagulant alone has a slow falling velocity, which is not desirable in the aspect of collecting efficiency.

According to this invention, combined use of inorganic coagulant and organic high-molecular coagulant enables to strengthen the linking force among the heavy metals, thereby enabling to form larger-sized particles having particulate size of 10 $\mu$m or greater, and ensuring sufficient mechanical strength. Such larger-sized particles have a faster falling velocity (0.001 cm/s or more).

The inorganic coagulant includes aluminum salts and iron salts, but is not limited thereto. One or more kinds of inorganic coagulants can be used in combination with an organic high-molecular coagulant. Particularly, aluminium sulfate is preferable as such an inorganic coagulant because this inorganic coagulant expels carbon dioxide gas dissolved in the bottoms and prevents float of particles due to existence of carbon dioxide gas to such an extent as to allow the floc of heavy metals to fall in the bottoms at a sufficient falling velocity.

The organic high-molecular coagulant includes anionic organic high-molecular coagulants, cationic organic high-molecular coagulants, nonionic organic high-molecular coagulants, and amphoionic organic high-molecular coagulants. It may be preferable to use an anionic organic high-molecular coagulant and a cationic organic high-molecular coagulants in combination, or an amphoionic organic high-molecular coagulant to obtain larger-sized floc having sufficient mechanical strength.

The anionic organic high-molecular coagulant is not limited to a specific one, and may include sodium polyacrylates, maleic acid copolymers, and partially-hydrolyzed salts of polyacrylamide.

The cationic organic high-molecular coagulant is also not limited to a specific one, and may include polyethyleneimines, water soluble aniline resins, and polythioureas.

Combined use of the anionic organic high-molecular coagulant and the cationic organic high-molecular coagulant is effective in forming floc of larger particles for the following reasons. The combined use helps adhesion among the heavy metal particles and formation of larger-sized particles due to cross-linking properties of the coagulants. Also, the combined use is effective in neutralizing negatively charged surfaces of the heavy metal particles, which further contributes to cross-linking. In the case where the anionic organic high-molecular coagulant and the cationic organic high-molecular coagulant are used in combination, it may be preferable to use sodium polyacrylate as the anionic organic high-molecular coagulant, and polyethyleneimine as the cationic organic high-molecular coagulant because use of the aforementioned coagulants is more effective in removing heavy metals from a waste liquid which has been discharged in the process of producing the aforementioned easily-polymerizable compounds.

The amphoionic organic high-molecular coagulant include dimethylaminoethyl acrylates (DAA)/acrylates (AA)/acrylamides (AAm) copolymers, dimethylaminoethylmethacrylate/AA/AAm copolymers, dimethylamino propylacrylamide hydrochlorides/AA/AAm copolymers, DAA/AA copolymers, and Mannich modifications of sodium acrylates/AAm copolymers. Among these, DAA/AA/AAm copolymers are preferable because they are effective in removing heavy metals from a waste liquid discharged in the process of producing the above easily-polymerizable compounds.

Use of the amphoionic coagulant provides substantially the same effect as the combined use of the anionic coagulant and the cationic coagulant.

The order of adding the coagulants is not limited to a specific one. However, to strengthen the linking between the particles and form larger-sized floc of heavy metals, it may be preferable to implement the steps of adding the inorganic coagulant and the cationic organic high-molecular coagulant together to the bottoms for agitation and mixing, and then adding the anionic organic high-molecular coagulant to the bottoms for agitation and mixing. It should be appreciated that there sometimes rises a case that simultaneous adding of the cationic organic high-molecular coagulant and the anionic organic high-molecular coagulant disables to form large-sized floc of heavy metals in the bottoms.

In the case where the amphoionic organic high-molecular coagulant is added, it may be preferable to add the inorganic coagulant to the bottoms for agitation and mixing, and then add the amphoionic organic high-molecular coagulant to the bottoms for agitation and mixing to strengthen the linking among the heavy metal particles and form larger-sized floc of heavy metals. In this case, there sometimes rises a case that simultaneous adding of the inorganic coagulant and the amphoionic organic high-molecular coagulant results in insufficient formation of larger-sized floc. In view of this, in the case where the inorganic coagulant and the amphoionic organic high-molecular coagulant are added together to the bottoms for agitation and mixing, it may be preferable to further add the amphoionic organic high-molecular coagulant after the agitation/mixing.

It may be preferable to add the coagulant, relative to the volume of the bottoms, in such an amount that: 10 to 1000 mg/L or more preferably 20 to 500 mg/L of the inorganic coagulant (in terms of anhydride); 5 to 100 mg/L or more preferably 10 to 50 mg/L of the cationic organic high-molecular coagulant; 2 to 50 mg/L or more preferably 5 to 30 mg/L of the anionic organic high-molecular coagulant; and 5 to 100 mg/L or more preferably 10 to 50 mg/L of the amphoionic organic high-molecular coagulant. Adding the coagulants in the aforementioned respective predetermined ranges is preferable to obtain good cross-linking effect.

As the amount of coagulant to be added to the bottoms increases, pH of the bottoms is lowered. As pH of the bottoms is lowered, the effect resulting from adding of the coagulant is lowered. In view of this, it may be preferable to supply an alkali compound to the agitation/mixing tank according to needs so that pH of the bottoms in the agitation/mixing tank is kept in a certain range. This is performed to obtain a maximal effect by addition of the coagulant, namely, to strengthen the lining among the heavy metals so as to form larger-sized floc and to allow the resultant larger-sized floc of heavy metals to speedily fall (set) in the bottoms. It should be noted that "according to needs" in this specification means to set the lowermost value of pH of the bottoms in the agitation/mixing tank at 6 or larger, preferably 7 or larger, and more preferably 8 or larger, and to set the uppermost value of pH at 12 or less, and preferably 10 or less. In the case where pH does not satisfy the aforementioned requirements, there sometimes rises a case that a sufficient effect due to addition of the coagulant is not obtained.

In this invention, coagulating the heavy metals in the bottoms to set the heavy metals in the bottoms, and concentrating the heavy metals to separate the condensed heavy metals from the bottoms enables to obtain treated water substantially free from the heavy metals. In this invention, the concentration treatment after setting of the heavy metals is referred to as a concentration process.

Means for separating and removing the heavy metals which have been set in the bottoms is not limited to a specific one. For instance, a device of a batch type or a continuous type may be applicable. In this invention, a device of a batch type is operated in such a manner that inflow of the bottoms is temporarily suspended when removing the heavy metals which have been coagulated and set in the bottoms. Such a device may be provided with a reservoir or a tank for temporarily storing the bottoms therein to allow the heavy metals that have been coagulated and set in the bottoms to fall in the bottoms for separation.

According to this invention, it may be preferable to use a continuously-operated thickner for continuously setting and concentrating the bottoms containing the coagulated heavy metals, or a continuously-operated clarifier in the aspect of separation efficiency.

In the case where a continuously-operated thickner or a continuously-operated clarifier is used, generally, it may be preferable to set the bottoms residence time in the device from 0.5 to 3 hours, preferably from 1 to 2 hours, the liquid rise linear velocity (=flow rate of raising the bottoms/sectional area of the device) from 0.1 to 3 m/h, preferably from 0.2 to 2 m/h, the rake rotation number from 0.1 to 10 rpm, preferably from 0.5 to 5 rpm to efficiently concentrate the heavy metals which have been coagulated and set in the bottoms.

Further, the treated water can be discharged outside the system by overflowing from the upper part of the concentration device under the aforementioned conditions. The thus discharged treated water substantially does not contain the heavy metals, and accordingly can be discharged outside the system. In the case where the device cannot satisfy the aforementioned conditions, there sometimes rises a case that separation efficiency is lowered, thus resulting in discharge of treated water containing residues of the heavy metals.

In the case where the heavy metals which are concentrated and discharged out of the system (hereinafter, also referred to as "concentrate") contain a bulky amount of water component, it may be preferable to put the concentrate in a dehydration process (not shown) so as to remove the water component from the concentrate. This process is desirable because the concentrate exhibit high fluidity, making it difficult to handle the concentrate as they are. Means for performing dehydration is not limited to a specific one, and may include a depressurizing/filtrating device, a pressurizing/filtrating device, and a centrifugal separator. A decanter-type centrifugal separator capable of continuously dehydrating a large amount of concentrate is preferable.

In the case where a decanter-type centrifugal separator is used, the concentrate are fed to the centrifugal separator for dehydration to obtain cakes of heavy metals containing about 40 to 90 mass % of water component. Since water obtained by operating the centrifugal separator substantially does not contain the heavy metals, such separated water (or treated water) can be directly discharged outside the system, or can be discharged outside the system by overflowing after circulating in the concentration device again.

It may be preferable to run the decanter-type centrifugal separator under such conditions that the number of rotation thereof ranges from 3000 to 6000 rpm and the centrifugal effect (ratio of centrifugal force to the gravity) ranges 2500 to 4500G in order to enhance dehydration performance and to obtain treated water generally free from the heavy metals.

According to an aspect of this invention, this invention enables to remove heavy metals from exhaust gas which has been generated by burning a waste liquid containing the heavy metals discharged in a process of producing organic compounds efficiently and in a simplified manner. According to another aspect of this invention, the inventive method enables to separate and remove heavy metals from a liquid used in gas-liquid contact for removing the heavy metals from exhaust gas. In the method of this invention, copper and manganese are efficiently separated and removed.

EXAMPLES

Hereinafter, this invention is described in details with reference to the examples.

Inventive Example 1

Waste liquid discharged from a process of producing acrylic acids and butyl acrylates (waste oil at 570 kg/h and waste water at 4.5 m$^3$/h, both of them contain heavy metals and organic compounds) was put into a vertical combustion furnace to burn the waste liquid at 950° C. Exhaust gas produced by the combustion was introduced into a tank filled with a liquid for direct contact. Independently of the gas drawing, an aqueous solution of sodium hydroxide was supplied to the tank so that pH of the liquid in the tank (bottoms) was kept at 8.2. After the gas drawing and supply of the aqueous solution, the bottoms were drained from the tank at 6 m³/h and fed to an agitation/mixing tank (corresponding to the gas-liquid contact device in this example). The concentrations of copper and manganese in the bottoms at the time of feeding to the agitation/mixing tank were respectively 104 mg/L and 166 mg/L. After feeding of the bottoms, 52 mg/L of an aqueous solution of 8 mass % sodium hydroxide (in terms of $Al_2O_3$ relative to the volume of the bottoms), and 15 mg/L of an aqueous solution of 30 mass % polyethyleneimine (in terms of solids relative to the volume of the bottoms) were added as coagulants to the agitation/mixing tank for agitation and mixing. Thereafter, 8 mg/L of an aqueous solution of 0.3 mass % sodium polyacrylate (in terms of solids relative to the volume of bottoms) was added for agitation and mixing to coagulate and set the heavy metals in the bottoms. An aqueous solution of sodium hydroxide was fed to the agitation/mixing tank for agitation and mixing so that pH of the bottoms after adding the coagulants was set at 8.5. In this example, the heavy metals were coagulated and set by a thickner to concentrate the heavy metals, while overflowing the bottoms to obtain treated water substantially free from the heavy metals. The concentrations of copper and manganese in the treated water were respectively 2.5 mg/L and 4.2 mg/L. Further, the concentrate of heavy metals were fed to a decanter-type centrifugal separator at 500 L/h to discharge solids of the heavy metals in the form of cake while returning water separated from the heavy metals by operation of the centrifugal separator to the thickner.

Comparative Example 1

An experiment in this example was implemented in the similar manner as in the Inventive Example 1 except that an aqueous solution of sodium hydroxide was not supplied to the bottoms tank and that an aqueous solution of sodium hydroxide was supplied to a coagulation tank (corresponding to the agitation/mixing tank of the Inventive Example) so that pH of the bottoms after adding the coagulant was set at 4. As a result of the experiment, pH of the bottoms was set at 1.7, and the concentrations of copper and manganese in the treated water were respectively 32.5 mg/L and 123 mg/L.

Comparative Example 2

An experiment in this example was implemented in the similar manner as in the Inventive example 1 except that coagulants, i.e., an aqueous solution of 8% aluminium sulfate, an aqueous solution of 30 mass % polyethyleneimine, and an aqueous solution of 0.3 mass % sodium polyacrylate were not added. As a result of the experiment, using the thickner did not produce visible agglomerates (floc). The decanter-type centrifugal separator failed to separate solids and water, and accordingly, no cake of solids was discharged.

Inventive Example 2

An experiment in this example was implemented in the similar manner as in the Inventive Example 1 except that an aqueous solution of sodium hydroxide was supplied to the tank so that pH of the bottoms was set at 3 and that an aqueous solution of sodium hydroxide was supplied to the coagulation tank (mixing/agitation tank) so that pH of the bottoms after adding the coagulant was set at 5. As a result of the experiment, the concentrations of copper and manganese in the treated water were respectively 8.4 mg/L and 32.0 mg/L.

Inventive Example 3

An experiment in this example was implemented in the similar manner as in the Inventive Example 1 except that an aqueous solution of sodium hydroxide was directly supplied to the vertical combustion furnace so that pH of the bottoms in the furnace was set at 5 and that an aqueous solution of sodium hydroxide was supplied to the agitation/mixing tank so that pH of the bottoms after adding the coagulant was set at 8.5. As a result of the experiment, the concentrations of copper and manganese in the treated water were respectively 0.2 mg/L and 2.5 mg/L.

Inventive Example 4

An experiment in this example was implemented in the similar manner as in Inventive Example 1 except that an aqueous solution of sodium hydroxide was directly supplied to the vertical combustion furnace so that pH of the bottoms in the furnace was set at 7 and that an aqueous solution of sodium hydroxide was supplied to the agitation/mixing tank so that pH of the bottoms after adding the coagulant was set at 8.5. As a result of the experiment, the concentrations of copper and manganese in the treated water were respectively 0.05 mg/L and 1.2 mg/L.

Inventive Example 5

An experiment in this example was implemented in the similar manner as in the Inventive Example 1 except that an aqueous solution of sodium hydroxide, an aqueous solution of 8% aluminium sulfate, and an aqueous solution of 0.3 mass % sodium polyacrylate were added for agitation and mixing, which followed adding of an aqueous solution of 30 mass % polyethyleneimine for agitation and mixing. As a result of the experiment, the concentrations of copper and manganese in the treated water were respectively 5.2 mg/L and 9.1 mg/L.

This application is based on patent application No. 2000-198230 filed in Japan, the contents of which are hereby incorporated by references.

As this invention may be embodied in several forms without departing from the spirit of essential characteristics thereof, the present embodiment is therefore illustrative an not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A method of removing heavy metals contained in exhaust gas generated by burning a waste liquid containing the heavy metals discharged in a process of producing organic compounds, wherein the waste liquid includes waste water and/or waste oil discharged from a process of producing (meth)acrylic acids and/or esters thereof, comprising the steps in the order of:
   (a) a combustion step of burning the waste liquid to produce exhaust gas;
   (b) a gas-liquid contact step of rendering a liquid containing an alkali compound in contact with the exhaust gas to precipitate the heavy metals in bottoms of the liquid, wherein, in the gas-liquid contact step, the amount of the alkali compound in the liquid is regulated to keep pH of the bottoms in the range of 4 to 10; and (c) a coagulating step of adding a coagulant to the bottoms to coagulate the heavy metals in the bottoms for removal of the heavy metals.

2. The method according to claim 1, further comprising the step of adding an alkali compound to the bottoms to keep pH of the bottoms in the range of 6 to 10.

3. The method according to claim 1, wherein the coagulant includes an inorganic coagulant and/or at least one member selected from the group consisting of anionic organic coagulants, cationic organic coagulants, nonionic organic coagulants, and amphoionic organic coagulants.

4. The method according to claim 1, wherein the coagulating step further includes the steps in the order of adding an inorganic coagulant and a cationic organic coagulant in combination for agitation and mixing, and adding an anionic organic coagulant.

5. The method according to claim 1, wherein the combustion step further includes the step of directly supplying an alkali compound to a combustion furnace in which the waste liquid is burned.

6. The method according to claim 1, further comprising, after the coagulating step, the steps in the order of concentrating the heavy metals in the bottoms to produce cakes of the heavy metals and dehydrating the cakes of the heavy metals by a centrifugal separator to obtain water substantially free from the heavy metals.

* * * * *